(12) United States Patent
Vadlakonda et al.

(10) Patent No.: US 7,953,881 B1
(45) Date of Patent: May 31, 2011

(54) NETWORK CHARACTERISTIC-BASED COMPRESSION OF NETWORK TRAFFIC

(75) Inventors: Sravan Vadlakonda, Sunnyvale, CA (US); Nitin Gugle, Cupertino, CA (US); Rohini Kasturi, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 315 days.

(21) Appl. No.: 12/137,999

(22) Filed: Jun. 12, 2008

(51) Int. Cl.
*G06F 15/16* (2006.01)

(52) U.S. Cl. .................................... 709/231; 709/233

(58) Field of Classification Search .................. 709/231
See application file for complete search history.

(56) References Cited

U.S. PATENT DOCUMENTS

| | | | |
|---|---|---|---|
| 5,951,623 A * | 9/1999 | Reynar et al. ............... | 708/203 |
| 5,953,503 A * | 9/1999 | Mitzenmacher et al. .... | 709/203 |
| 6,088,699 A * | 7/2000 | Gampper et al. ............ | 1/1 |
| 6,434,561 B1 * | 8/2002 | Durst et al. ................. | 1/1 |
| 7,002,993 B1 * | 2/2006 | Mohaban et al. ............ | 370/471 |
| 7,177,944 B1 * | 2/2007 | Chen et al. .................. | 709/237 |
| 7,420,992 B1 * | 9/2008 | Fang et al. .................. | 370/477 |
| 7,613,131 B2 * | 11/2009 | Decasper et al. ............ | 370/254 |
| 2002/0097723 A1 * | 7/2002 | Tourunen et al. ............ | 370/392 |
| 2003/0206125 A1 * | 11/2003 | Abdat .......................... | 341/51 |
| 2004/0210668 A1 * | 10/2004 | Garakani et al. ............ | 709/236 |
| 2005/0185677 A1 * | 8/2005 | Christoffersson et al. ... | 370/521 |
| 2006/0018556 A1 * | 1/2006 | Ghildiyal .................... | 382/232 |
| 2007/0085714 A1 * | 4/2007 | Levy ........................... | 341/51 |
| 2007/0096953 A1 * | 5/2007 | Odagiri ....................... | 341/50 |
| 2008/0037509 A1 * | 2/2008 | Foti ............................. | 370/349 |
| 2009/0019345 A1 * | 1/2009 | Kaufman et al. ............ | 714/807 |
| 2009/0024763 A1 * | 1/2009 | Stepin et al. ................ | 709/247 |
| 2010/0023618 A1 * | 1/2010 | Chitnis et al. ............... | 709/224 |

* cited by examiner

*Primary Examiner* — Bunjob Jaroenchonwanit
(74) *Attorney, Agent, or Firm* — Harrity & Harrity, LLP

(57) ABSTRACT

A network optimization device may receive a stream of data and identify a selected compression dictionary from among a number of compression dictionaries based on the received stream of data. A receiving network device may be notified regarding the selected compression dictionary. The stream of data may be compressed using the selected compression dictionary and transmitted to the receiving device.

17 Claims, 8 Drawing Sheets

NETWORK CHARACTERISTIC-BASED COMPRESSION OF NETWORK TRAFFIC

BACKGROUND OF THE INVENTION

1. Field of the Invention

Concepts described herein relate generally to data compression, and more particularly, to a dictionary based compression scheme in a wide area network optimization device.

2. Description of Related Art

Geographically distributed entities, such as a business with multiple local offices in different locations, frequently desire to maintain a logically unified proprietary network that is accessible by all of the geographically distributed entities. To accomplish this, a wide area network (WAN) may be used to link the different locations.

Information technology managers within geographically distributed entities face the conflicting requirements of keeping costs in check while providing users with new and faster applications. This conflict is most acute on the WAN, where costs can be high and getting applications to perform well is often hampered by limited bandwidth and high latency.

Solutions are known to help improve performance over the WAN portion of a network. These solutions may be based on a number of technologies, including data compression, data prefetching and caching, application-specific acceleration, and policy-based bandwidth allocation.

Data caching and compression, in particular, can be used to reduce the perceived latency (response time) of data accesses over a WAN. Compression and caching techniques may be disk-based, as opposed to semiconductor memory based, due to orders-of-magnitude larger storage capacity of typical hard disk drives.

Dictionary-based compression techniques can be particularly effective in compressing large file transfers. With this type of compression technique, data may be stored at compression devices at opposite ends of the WAN. When a block of data that has been previously sent is again received by the compression device, the compression device does not need to send the actual block of data. Instead, it may simply send a reference to the block of data to the device on the other end of the WAN.

Unfortunately, as more and more types and sizes of information are transmitted across a WAN, the data stored for execution of the compression technique grows as well, thereby decreasing the efficiency and increasing the time and processing cost associated with the compression operation.

SUMMARY

In one aspect, a method may include receiving a stream of data; identifying a selected compression dictionary from among a number of compression dictionaries based on the stream of data; notifying a receiving device about the selected compression dictionary; compressing the stream of data using the selected compression dictionary; and transmitting the compressed stream of data to the receiving device.

In another aspect, a device for compressing data over a network may include logic to identify a compression dictionary associated with a received data stream, where the identified compression dictionary is one of a number of available compression dictionaries; logic to notify a receiving device regarding the identified compression dictionary; logic to compress the received data stream using the identified compression dictionary to generate a compressed data stream; and logic to transmit the compressed data stream to the receiving device over a network.

In yet another aspect, a system may include a transmitting network device to receive a data stream from a first local network and transmit a compressed data stream via a wide area network and a receiving network device to receive the compressed data stream from the wide area network. The transmitting network device may include logic to identify a selected compression dictionary from a number of compression dictionaries based on the received data stream; logic to output a notification message to the receiving network device, where the notification message includes at least an identification of the selected compression dictionary; logic to receive an acknowledgement message from the receiving network device indicating receipt of the notification message; logic to compress the data stream using the selected compression dictionary; and logic to transmit the compressed data stream to the receiving network device via the wide area network. The receiving network device may include logic to receive the notification message from the transmitting network device; logic to identify the selected compression dictionary from the notification message; logic to transmit the acknowledgement message to the transmitting network device; logic to receive the compressed data stream; and logic to decompress the compressed data stream using the selected compression dictionary.

In still another aspect, a method for decompressing a compressed data stream may include receiving a compression dictionary notification message from a transmitting network device via a network; identifying a selected compression dictionary from the compression dictionary notification message; receiving the compressed data stream; and decompressing the compressed data stream using the selected compression dictionary.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network optimization device may operate to increase application performance over a wide area network. The network optimization device may use disk-based compression to achieve the performance increase. The disk-based compression may be performed using an efficient indexing scheme.

Exemplary System Overview

Figure 1:
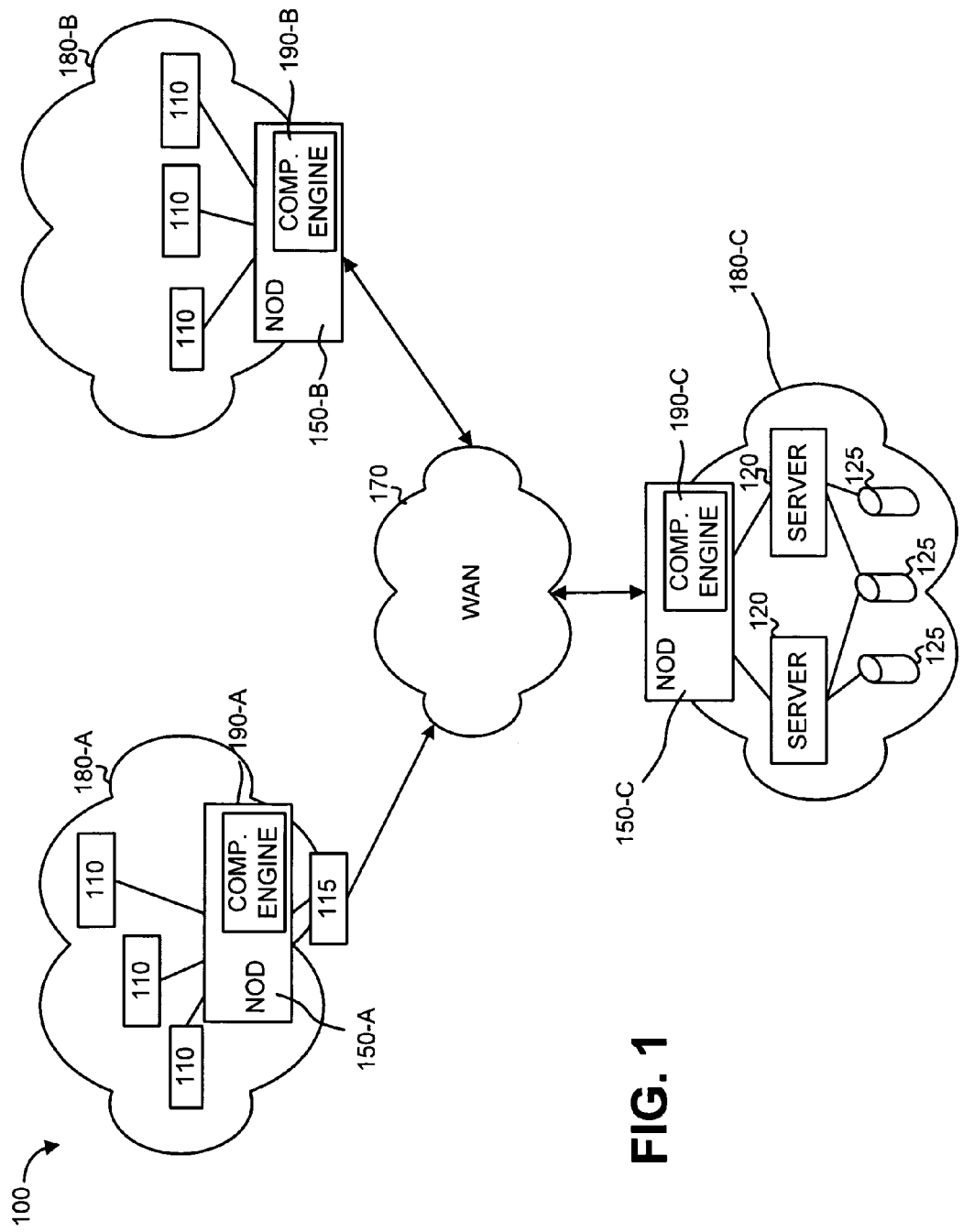
FIG. 1 is a diagram of an exemplary system.

FIG. 1 is a diagram of an exemplary system 100. System 100 may include a wide area network (WAN) 170 and one or more private networks 180-A, 180-B, and 180-C (collectively referred to as private networks 180). Private networks 180 may be geographically dispersed and different ones of private networks 180 may wish to communicate with one another over WAN 170. Private networks 180 may each, for example, be a local area network (LAN) for a branch office associated with a corporation or other entity. As another example, private networks 180-A and 180-B may be LANs for a corporate branch office and private network 180-C may be a data center for the corporation.

WAN 170 may include a public network, such as the Internet. In some implementations, WAN 170 may be implemented by privately owned or leased data lines between private networks 180, or by a combination of a public network and privately owned or leased data lines. In one implementation, data traffic between private networks 180 through WAN 170 may be characterized by one or more of increased cost, higher latency, or lower bandwidth than data traffic within a single corporate network 180. Accordingly, network applications accessing resources between a number of private networks 180 and across WAN 170 may tend to run less optimally than an application running locally at a private network 180.

Private networks 180 may each include a number of computing devices, such as, for example, client computing stations 110, network security device(s) 115, servers 120, and databases 125. Client computing stations 110 may include computing devices of end-users, such as desktop computers or laptops. Network security devices 115 may include, for example, firewalls or other devices relating to network security. Servers 120 may include one or more devices designed to interact with and deliver information to other devices, such as client computing stations 110. Databases 125 may include information repositories available on, for example, network 180-C. Servers 120 may, for example, serve data files or network applications to computing stations 110 over WAN 170. Servers may interact with databases 125 when providing information to client computing stations 110.

In the exemplary system shown in FIG. 1, private networks 180-A and 180-B may be branch offices that include a number of client computing stations 110 and private network 180-C may function as a data center that includes a number of servers 120, which may include file servers for private networks 180-A and 180-B. One of ordinary skill in the art will recognize that the number of private networks shown in FIG. 1 (three), the elements associated with each private network and/or the functionality of each private network is exemplary.

Consistent with an aspect of the invention, private networks may be associated with network optimization devices (NODs) 150-A through 150-C (collectively referred to as network optimization devices 150). As shown in FIG. 1, for example, each of private networks 180-A through 180-C is associated with a corresponding network optimization device 150-A, 150-B, and 150-C, respectively. Network optimization devices 150 may generally operate to enhance the performance of applications running over WAN 170 between various ones of private networks 180. For example, assume that a user at one of client computing stations 110 at private network 180-A would like to retrieve a file from a file server at private network 180-C. In this situation, network optimization devices 150-A and 150-C may operate to decrease the latency and/or increase the bandwidth of WAN 170 by providing, for example, data compression, data caching, and data prefetching services over WAN 170. Aspects of network optimization devices 150 as they relate to data compression will be particularly described in more detail herein. In particular, network optimization devices 150-A through 150-C may include a compression engines 190-A, 190-B, and 190-C (collectively referred to as compression engines 190), respectively, for facilitating and implementing the dynamic compression scheme set forth in detail below.

Exemplary Device Architecture

Figure 2:
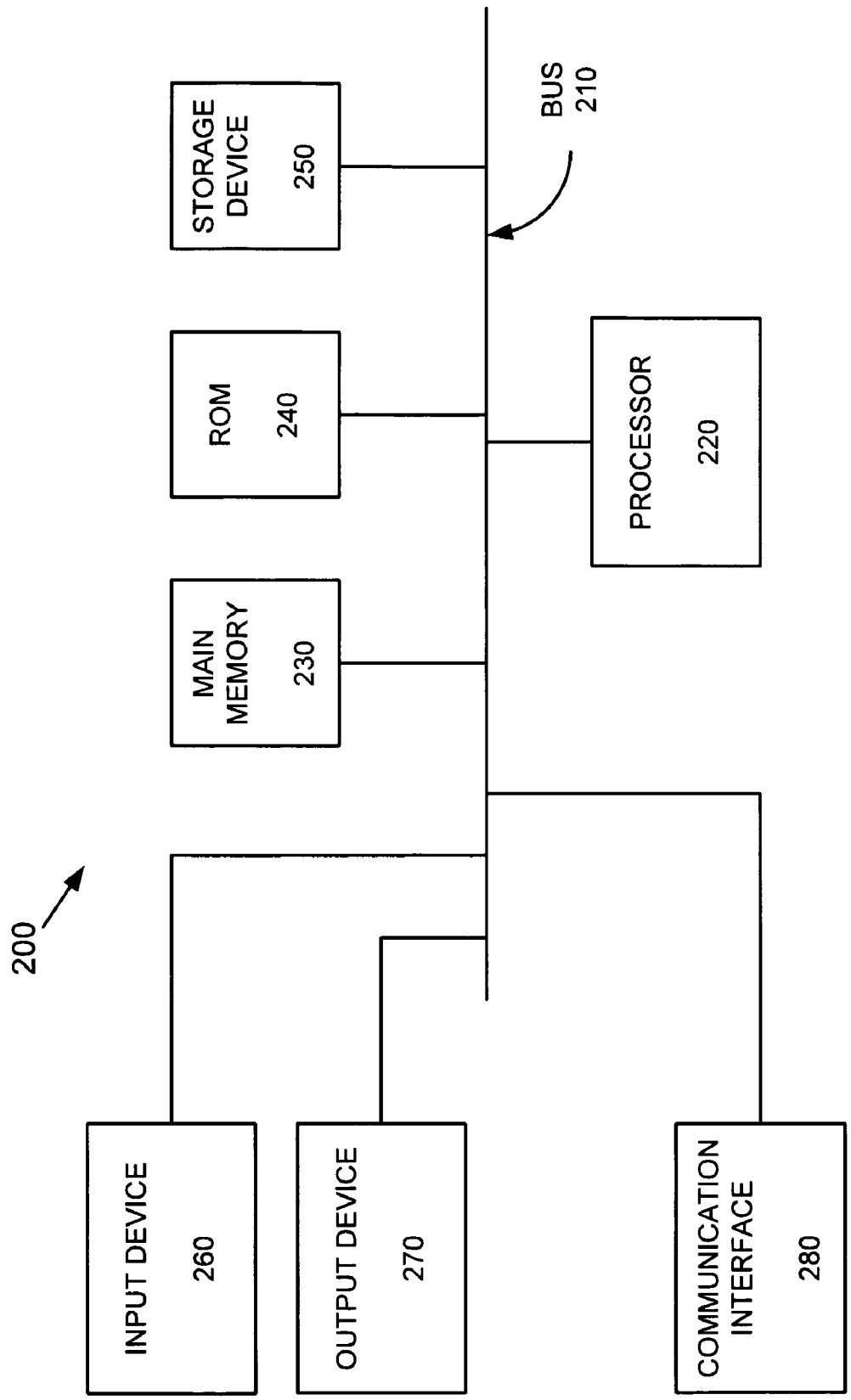
FIG. 2 is a block diagram of an exemplary device shown in FIG. 1.

FIG. 2 is a block diagram of an exemplary device 200, which may correspond to one or more of client computing stations 110, network security device 115, a server 120 (also referred to herein as file server 120), a database 125, or a network optimization device 150. Device 200 may include bus 210, processor 220, main memory 230, read only memory (ROM) 240, storage device 250, input device 260, output device 270, and communication interface 280. Bus 210 may include a path that permits communication among the elements of the device.

Processor 220 may include a processor, microprocessor, ASIC, FPGA, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic storage medium such as a hard disk drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

Device 200 may perform certain operations, as described in detail below. The device may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Network, Application, and Protocol-Based Compression

Before describing the operation of network optimization devices 150 in additional detail, it will be helpful to generally describe compression over a wide area network.

Figure 3:
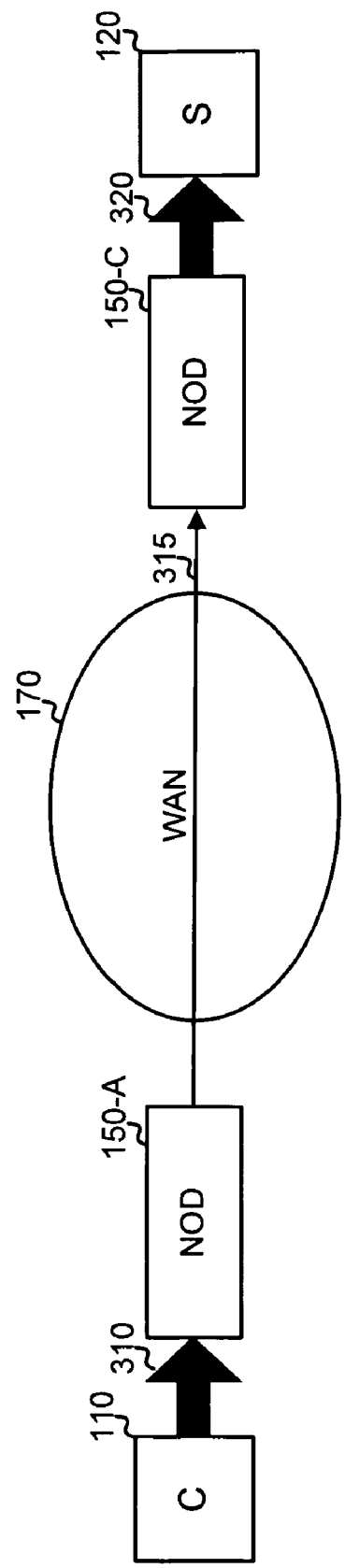
FIG. 3 is a diagram illustrating data compression over a wide area network.

FIG. 3 is a block diagram illustrating data compression over a WAN to improve perceived application performance over the WAN. The data may be, for example, file data being transferred to a remote server, such as a file being transferred by a client computing station 110 to a file server 120.

Assume that client computing station 110, in private network 180-A, would like to transfer a file or a portion of a file to file server 120, in private network 180-C. The file transfer is being made across WAN 170. Network optimization devices 150-A and 150-C may operate together to increase the perceived performance of file transfers for client computing station 110 by, among other things, using data compression when transferring data over WAN 170.

One form of data compression is known as symbol or dictionary-based compression. With this form of data compression (examples include the Lempel-Ziv (LZ) family of compression algorithms, etc.), pairs of network optimization devices 150 may store patterns of data, such as patterns from previously exchanged data, as strings in memory or on a hard disk drive. Each string of data may be associated with an identifier or codeword, such as a location on the hard disk drive or a position in an index. Each string should ideally be much longer than the corresponding codeword. When a string to be compressed is subsequently encountered, only the codeword corresponding to the string is sent, rather than the string itself. Dictionary-based compression techniques are often referred to as lossless compression, because no data is lost during compression and decompression of the data.

As a simplified example of the operation of data compression for transmitted data, assume that client computing station 110 initiates transmission of data to file server 120, shown as arrow 310 in FIG. 3. Network optimization device 150-A may examine the data to either store new strings of information or look for previously stored strings of information. If network optimization device 150-A locates a previously stored string that is also stored at network optimization device 150-C (as part of a compression dictionary shared or independently created on various devices 150 on WAN 170), network optimization device 150-A may transmit the codeword for the symbol, instead of the actual or literal string, to network optimization device 150-C (shown as arrow 315). Network optimization device 150-C may receive the codeword in the data stream from network optimization device 150-A. Network optimization device 150-C may lookup the string corresponding to the received codeword in its own dictionary and may substitute the identified string into the data stream before transmitting the data stream to file server 120 (shown as arrow 320). In this manner, the actual data sent over WAN 170 is compressed relative to the original stream sent by client computing station 110 to file server 120.

To efficiently implement a dictionary-based compression scheme, it is desirable to be able to efficiently identify data that was previously seen or sent. Unfortunately, as noted above, as increasing quantities and types of information are transmitted over WAN 170, the size of the compression dictionary will similarly increase. As the size of the compression dictionary increases, the efficiency with which previously identified strings may be identified is reduced.

In accordance with one implementation described herein, enhanced compression speed and efficiency may be obtained by maintaining and propagating multiple different compression dictionaries. The selection or usage of a particular compression dictionary may be based on network-specific information associated with the data to be compressed, such as a network protocol associated with the data, a port or range of ports associated with the data, or a combination of network characteristics. In this manner, a size of a compression dictionary to be searched during the compression of a data stream may be minimized. Further, by restricting an applied compression dictionary to relate more specifically to a type of data being transmitted, additional compression efficiencies may be realized.

Figure 4A:
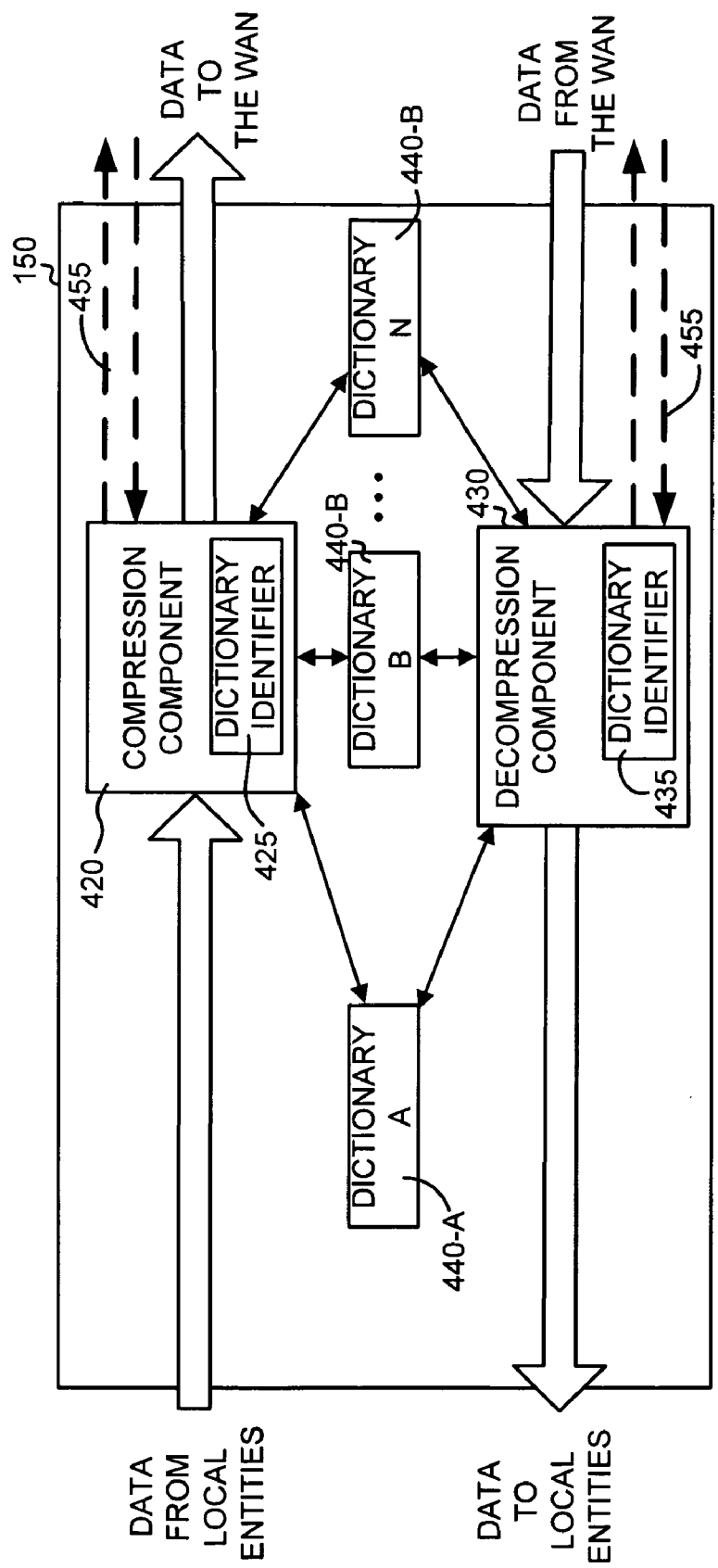
FIGS. 4A and 4B are diagrams conceptually illustrating exemplary elements of a network optimization device.

FIG. 4A is a diagram conceptually illustrating exemplary elements of one of network optimization devices 150. Network optimization device 150 may include compression component 420, compression dictionary identifier logic 425, decompression component 430, decompression dictionary identifier logic 435, and dictionaries 440-A, 440-B, and 440-N.

Compression component 420 and decompression component 430 may perform dictionary-based compression and decompression of data for entities transferring data through network optimization device 150. An entity, as used herein, may refer to any distinguishable unit that uses network optimization device 150, such as a computer, a process, or a group of computers/processes. Although shown as a single component in FIG. 4A, it can be appreciated that each of compression component 420 and decompression component 430 may be implemented using one or more physical or logical elements. Alternatively, compression component 420 and decompression component 430 may be combined as a single component.

In one implementation consistent with embodiments described herein, compression component 420 and decompression component 430 may create and/or utilize one of compression dictionaries 440-A to 440-N in compressing data being sent to the WAN or decompressing data received from the WAN. For example, compression component 420 may receive data from a local network or local device, such as client computing station 110. In one implementation, compression component 420 may receive a TCP (transmission control protocol) data stream from a local network. The received data stream may include various types of data, such as http (hypertext transfer protocol) data, sip (session initiation protocol) data, ftp (file transfer protocol) data, etc. The received data stream may include packet information associated with the data being transmitted.

In accordance with embodiments described herein, data sharing predefined network characteristics may be compressed using a common dictionary that is not applied to unrelated or dissimilar types of information. By restricting a compression dictionary to utilize only data meeting predetermined criteria, the size of the dictionary may be kept small, thereby increasing the speed and efficiency with which it is used. In one implementation, compression dictionary identifier logic 425 may analyze the received data and may identify a compression dictionary (e.g., compression dictionaries 440-A to 440-N) to use based on predefined or automatic data compression rules.

Figure 4B:
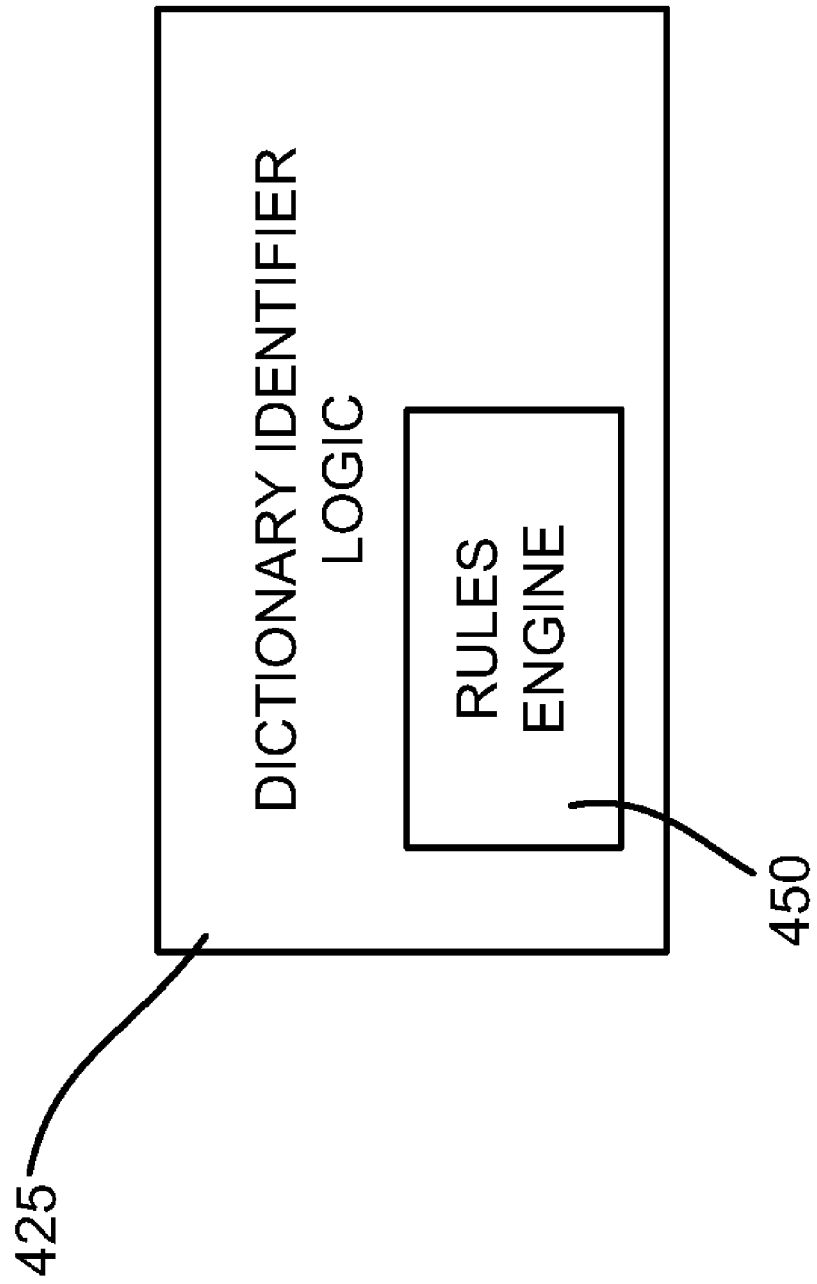

For example, as shown in FIG. 4B, compression dictionary identifier logic 425 may include a rules engine 450 for applying such compression rules to the received data stream. In one embodiment, rules engine 450 may be configured to identify data based on a number of different network-based criteria. For example, rules engine 450 may analyze the data stream for information relating to protocol types (e.g., http, sip, ftp, etc.). In addition, rules engine 450 may analyze the data stream for information relating to specific destination port numbers or ranges of destination port numbers. In yet another example, individual data flows may be identified, where a data flow may be identified based on various network characteristics, such as, for example, source and destination IP (Internet protocol) addresses, source and destination port numbers, and a protocol type associated with the flow. Consistent with embodiments described herein, network optimization device 150 may include a default compression dictionary (e.g., one of compression dictionaries 440-A to 440-N) that is used to compress data that does not correspond to an identified compression rule.

In one implementation consistent with aspects described herein, the compression rules in rules engine 450 may be received from users via a user interface associated with network optimization device 150. In other implementations, rules engine 450 may be configured to automatically create compression rules based on network conditions associated with the data passing through network optimization device 150. For example, rules engine 450 may be configured to automatically monitor the data for traffic-related criteria, such as a threshold amount of data associated with one or more network characteristics, e.g., a flow, a protocol, etc., received within a predetermined amount of time. When it is determined that a threshold amount of data has been met, rules engine 450 may be configured to create one or more compression rules based on the identified network characteristic.

Once rules engine 450 of compression dictionary identifier logic 425 identifies a compression rule associated with received data, compression component 420 may determine whether one of existing compression dictionaries 440-A to 440-N corresponds to the identified compression rule. For example, compression dictionary identifier logic 425 may determine whether either the rule being applied is a newly created rule or whether the initial data associated with a rule is initially received. If an existing compression dictionary does not correspond to the identified compression rule (e.g., in storage device 250), compression component 420 may create a new compression dictionary in compression component 420 (e.g., in storage device 250). As described above in relation to known dictionary-based compression systems, each compression dictionary 440-A to 440-N may be dynamically created as data associated with the particular compression dictionary is received by network optimization device 150. As more data associated with the compression dictionary is received, the compression dictionary becomes more and more populated. However, if an existing compression dictionary is identified as corresponding to the data, the identified compression dictionary may be used to compress the received data, with additional unique data being added to the dictionary in a known manner.

Because each transmitting network optimization device 150-A may create and update a number of different compression dictionaries 440 for an outbound data stream, network optimization device 150-A may also be provided with a mechanism for notifying a receiving network optimization device 150-C of which compression dictionaries have been created and which compression dictionary is being used to compress a current data stream. In one implementation consistent with aspects described herein, the notification of a compression dictionary being created and/or used may be provided via an out-of-band message, sent to receiving network optimization device 150-C. For example, the notification message may include at least a sequence number associated with the beginning of the compressed data and information regarding which rule has been applied and/or which dictionary has been used to compress the data. The notification message may be transmitted through WAN 170 via an out-of-band compression dictionary message formatted in any suitable format, such as extensible markup language (XML) or simple network management protocol (SNMP) message. Transmission of such a message is illustrated in FIG. 4A by dashed lines 455. In one embodiment, the out-of-band compression dictionary message may be transmitted prior to using the identified dictionary, with a responsive acknowledgement message being received from receiving network optimization device 150-C prior to usage of the identified compression dictionary. This ensures that the receiving network optimization device 150-C will apply the appropriate compression dictionary in decompressing the received data stream.

In an alternative implementation, the notification of a compression dictionary being created and/or used may be provided via in-band signaling, where the dictionary identification and/or compression rule information may be injected into an initial portion of the data stream being compressed. Upon receipt of this in-band signaling information, receiving network optimization device 150-C may determine the appropriate dictionary to either create or apply to the received data stream. As with the above-described out-of-band implementation, transmitting network optimization device 150-A may require an acknowledgement message from receiving network optimization device 150-C prior to usage of the identified dictionary.

Each dictionary 440 may include an index of the historical data seen by compression component 420 and decompression component 430 and identified as relating to a rule associated with that dictionary. By limiting the contents of each dictionary 440 to only entries identified by a rule, a size of each dictionary may be reduced. Each dictionary 440 may be stored in, for example, a storage device, such as main memory 230 or storage device 250. In some exemplary implementations, each dictionary 440 may be refreshed or reinitiated in response to a user command or in response to predefined criteria, such as the passage of a set length of time, or reaching a set size limit. By providing such refreshing, a speed with which compression is accomplished may be maximized.

When acting as a receiving network optimization device 150, a compression dictionary notification message may be received via either in-band or out-of-band signaling. As described above, the compression dictionary notification message may include a sequence number associated with the beginning of the compressed data as well as an indication of a compression dictionary and/or compression rule used to compress the data.

Upon receipt of the compression dictionary notification message, decompression component 430 may return an acknowledgement message to transmitting network optimization device 150A. Decompression dictionary identifier logic 435 may then examine the compression dictionary notification message and determine whether an existing dictionary corresponds to the received message. If not, decompression component 430 may establish a new dictionary corresponding to the rule identified in the compression dictionary notification message. In one implementation consistent with embodiments described herein, the rule corresponding to the established dictionary may be stored in rules engine 450 for use in compressing subsequent outgoing data.

Once an appropriate dictionary has been either identified or established, compressed data received from transmitting network optimization device 150-A via WAN 170 may be decompressed using the identified compression dictionary. The decompressed data may then be forwarded to local entities, applications, or devices.

Figure 5:
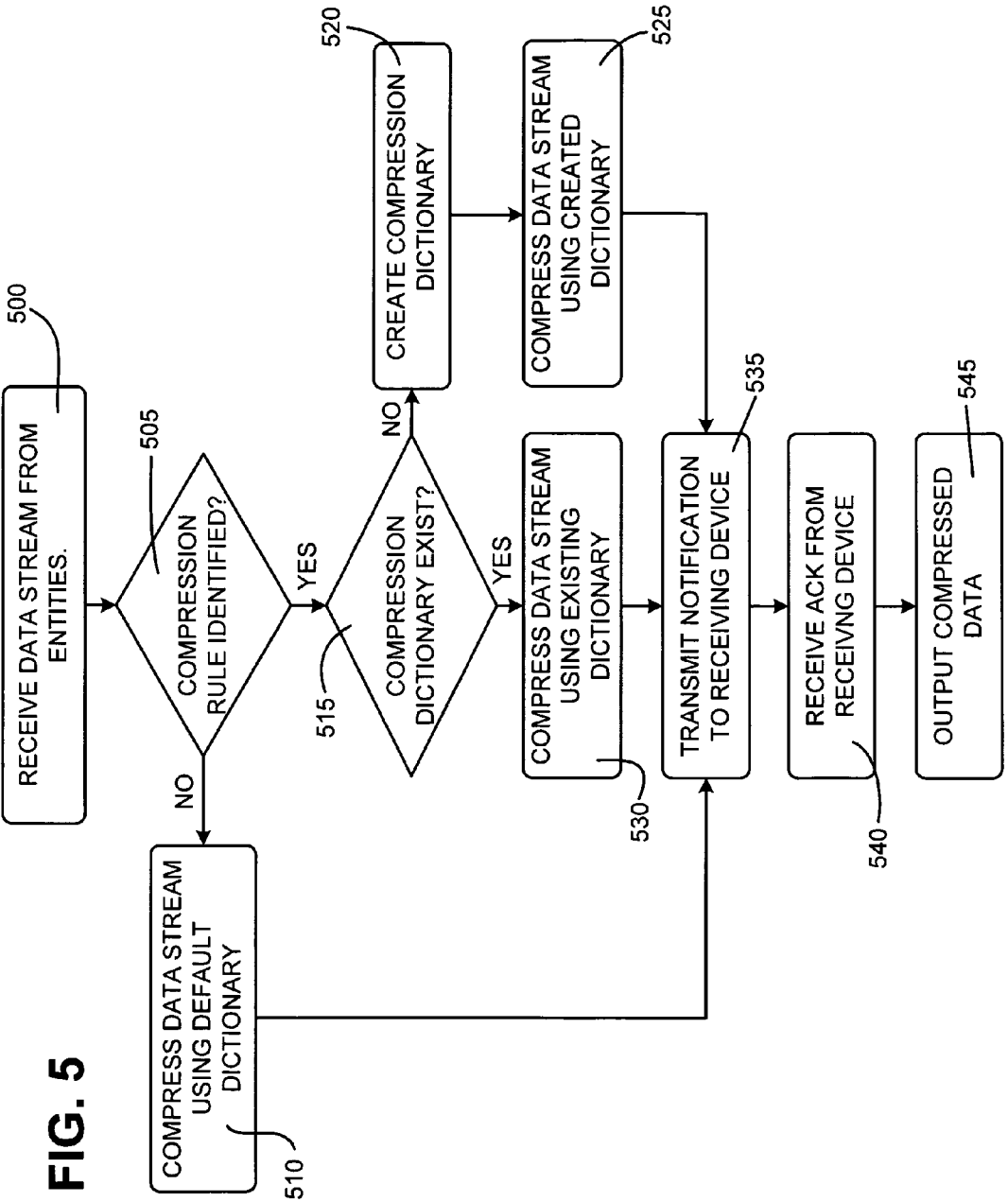
FIG. 5 is a flow chart illustrating an exemplary process for compressing and transmitting data from a first network optimization device a second network optimization device of FIG. 3.

FIG. 5 is a flow chart illustrating an exemplary process for compressing and transmitting data from compression component 420 of network optimization device 150-A to decompression component 430 of network optimization device 150-C. Compression component 420 may receive data, such as packets, from entities local to compression component 420

(block 500). The data received may be treated and processed by compression component 420 as a sequential stream of data.

Once received, compression dictionary identifier logic 425 may compare the data with one or more compression rules maintained and/or configured by rule engine 450 to determine whether a particular compression dictionary is to be used to compress the data (block 505). As described above, rule engine 450 may be configured to automatically create a rule and/or compression dictionary based on the satisfaction of various network-related characteristics.

If no rule applying to the received data is identified (block 505-NO), the data may be compressed using a default or standard dictionary (block 510). However, if a rule is identified (or created) that applies to the received data (block 505-YES), compression dictionary identifier logic 425 may determine whether a corresponding compression dictionary associated with the rule has been previously created (block 515). If no corresponding compression dictionary has been previously created (block 515-NO), a compression dictionary corresponding to the identified rule may be generated (block 520) and the received data may be compressed using the generated compression dictionary (block 525).

Returning to block 515, when it is determined that a compression dictionary corresponding to the identified rule exists or has been previously established (block 515-YES), the received data may be compressed using the previously established compression dictionary (block 530).

Following compression of the data using either the default compression dictionary, a newly created compression dictionary, or a previously established compression dictionary, a compression dictionary notification message may be transmitted to the receiving network optimization device (block 535). As described above, the compression dictionary notification message may include an out-of-band message transmitted to the receiving network optimization device that includes at least a sequence number associated with the compressed data and an identification of the compression dictionary and/or rule used to compress the data. In other implementations, the compression dictionary notification message may be transmitted in-band.

An acknowledgement of receipt of the compression dictionary notification message may be received from the receiving network optimization device (block 540). This acknowledgement may be in the form of an in-kind acknowledgment message (ACK). For example, an out-of-band compression dictionary notification message may be acknowledged via a return out-of-band acknowledgement message. Similarly, an in-band compression dictionary notification message may be acknowledged via a return in-band acknowledgement message.

Once the acknowledgement message has been received, network optimization device 150-A may output the compressed data via WAN 170 to receiving network optimization device 150-C (block 545).

Figure 6:
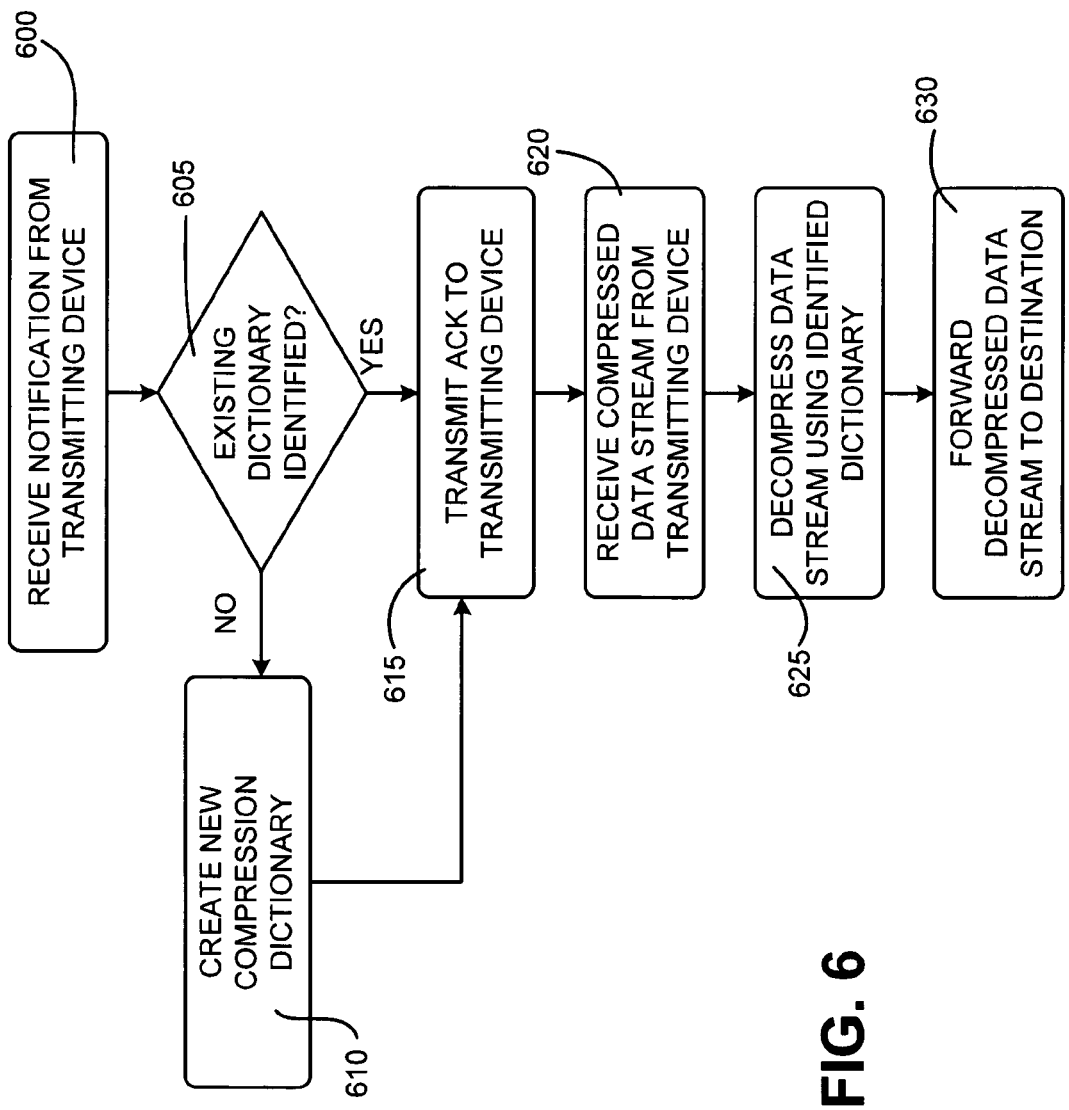
FIG. 6 is a flow chart illustrating an exemplary process for receiving and decompressing data at a receiving network optimization device of FIG. 3.

FIG. 6 is a flow chart illustrating an exemplary process for receiving and decompressing data by decompression component 430 of network optimization device 150-C. The process may begin with decompression component 430 of network optimization device 150-C receiving a compression dictionary notification message from transmitting network optimization device 150-A (block 600). As described above, the compression dictionary notification message may include an out-of-band message transmitted to the receiving network optimization device that includes at least a sequence number associated with the compressed data and an identification of the compression dictionary and/or rule used to compress the data. In other implementations, the compression dictionary notification message may be transmitted in-band.

Decompression dictionary identifier logic 435 of decompression component 430 may identify either a previously established compression dictionary to use or the basis for a newly created compression dictionary based on the received compression dictionary notification message (block 605). If a new compression dictionary is to be created in response to the received compression dictionary notification message, the compression dictionary may be created at block 610.

An acknowledgement of receipt of the compression dictionary notification message may be transmitted to transmitting network optimization device 150-A (block 615). This acknowledgement may be in the form of an in-kind acknowledgment message. For example, an out-of-band compression dictionary notification message may be acknowledged via a return out-of-band acknowledgement message. Similarly, an in-band compression dictionary notification message may be acknowledged via a return in-band acknowledgement message.

Compressed data may be received from transmitting network optimization device 150-A (block 620). The received data may be decompressed based on the dictionary identified by or created in response to the received compression dictionary notification message (block 625). The decompressed data may then be forwarded to a destination device or application (block 630).

Figure 7:
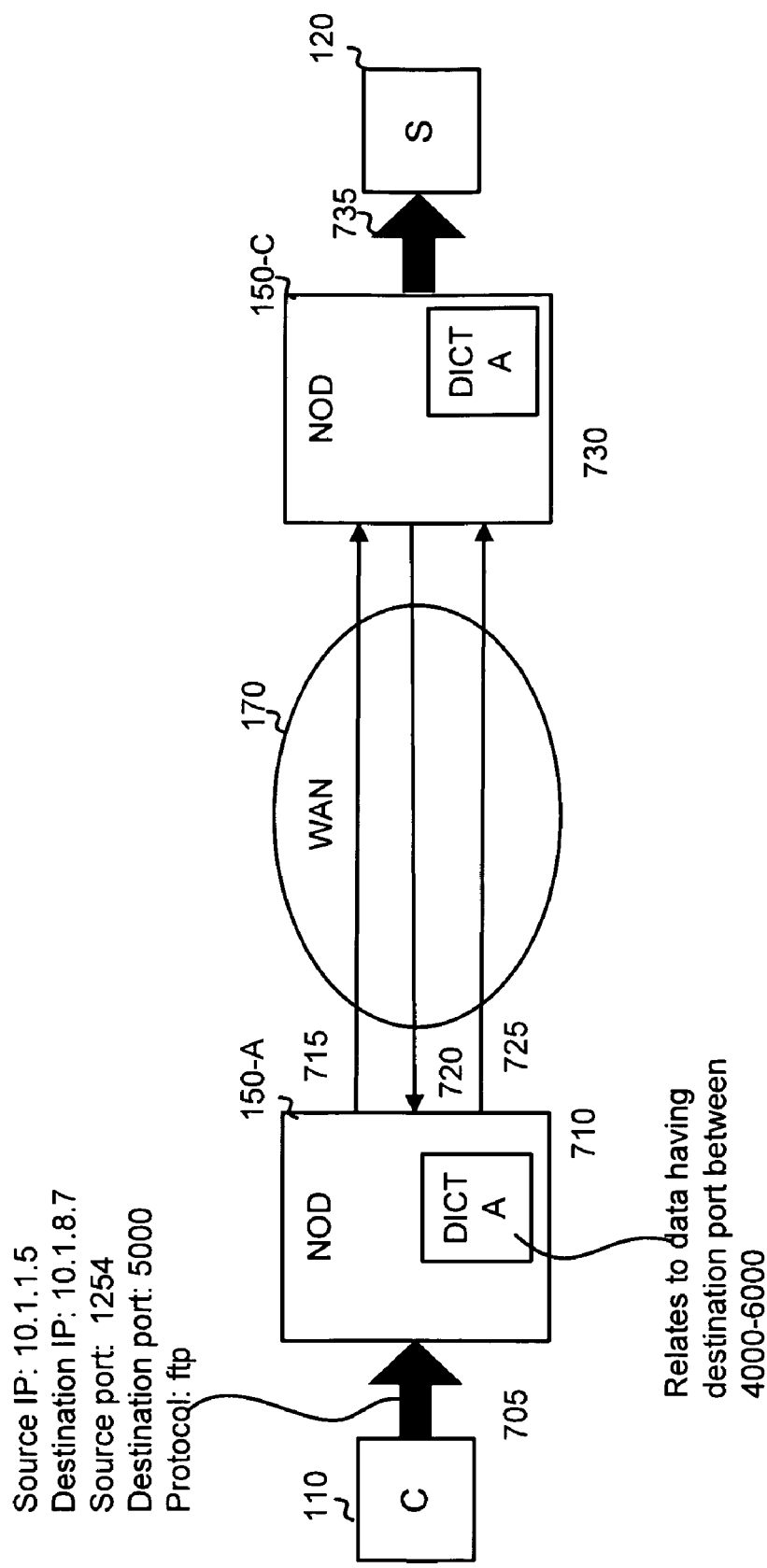
FIG. 7 is a diagram of an exemplary data stream compression and decompression operation conceptually illustrating certain of the operations shown in the flow chart of FIGS. 5 and 6.

FIG. 7 is a diagram illustrating an exemplary data compression operation consistent with embodiments described above in FIGS. 4A-6. For the purposes of this example, assume that a client device 110 wishes to send data 705 to a remote file server 120 via WAN 170. Upon leaving client device 110, data 705 may include the following network characteristics: a source IP address of 10.1.1.5; a destination IP address of 10.1.8.7; a source port of 1254; a destination port of 5000; and a protocol of ftp.

In the manner described above, data 705 may be received by network optimization device 150-A prior to being transmitted across WAN 170. Upon receipt by network optimization device 150-A, dictionary identifier logic 425 may determine which compression dictionary should be used to compress the data. To accomplish this, compression dictionary identifier logic 425 may consult rules engine 450 for determining whether any existing or automatically generated rules exist which apply to received data 705. For the purposes of this example, assume that rules engine 450 identifies a rule indicating that data having a destination port in the range of 4000-6000 should be compressed using compression dictionary A 710. It should be noted that the rule described above is merely exemplary and that any suitable network-based characteristic, such as flow, protocol, IP addresses, etc., may be used to identify and/or generate a corresponding compression dictionary.

Following this determination, a compression dictionary notification message 715 may be transmitted to network optimization device 150-C via WAN 170. As described in detail above, this message may be transmitted in either an out-of-band or in-band manner. Upon receipt of compression dictionary notification message 715, decompression component 430 and decompression dictionary identifier logic 435 may determine that compression dictionary A 730 is to be used to decompress data received from network optimization device 150-A. A return acknowledgement message 720 may be transmitted back to network optimization device 150-A, thus indicating that network optimization device 150-C is ready to receive compressed data.

Once network optimization device 150-A has received acknowledgement message 720, network optimization device 150-A compresses data 705 using compression dictionary A 710 and transmits compressed data 725 to network optimization device 150-C. Upon receipt of compressed data 725, network optimization device 150-C decompresses data 725 using compression dictionary A 730 and forwards decompressed data 735 to file server 120.

The techniques discussed above for compressing and sending data over a WAN may provide a number of advantages relative to existing techniques. For example, by using a number of customizable and dynamic compression libraries, the speed and efficiency with which compression of network traffic may be accomplished is significantly increased. This also increases bandwidth between devices on the network. Furthermore, by enabling for in-band or out-of-band exchange of a dictionary notification message, a sending device may efficiently notify a receiving device regarding the compression dictionary to be used and/or the underlying criteria on which the applied compression dictionary is based.

CONCLUSION

A network characteristic dependent compression technique is described for optimizing the performance of WAN data transfer. The technique uses a rules engine to determine or initiate creation of a compression dictionary based on user-defined or automatically defined network criteria associated with received data. A dictionary notification message may be sent to a receiving network optimizing device, to notify the receiving device about the compression dictionary to be used to compress the data.

While a series of acts have been described with regard to FIGS. 5 and 6, the order of the acts may be varied in other implementations consistent with the invention. Moreover, non-dependent acts may be implemented in parallel. Also, the term "user" has been used herein. The term "user" is intended to be broadly interpreted to include a workstation or a user of a workstation.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   receiving, by a network device, a stream of data;
   selecting, by the network device, a compression dictionary from among a number of compression dictionaries based on the stream of data;
   transmitting, by the network device, a compression dictionary notification message to a receiving device regarding the compression dictionary, where the compression dictionary notification message comprises at least an initial sequence number associated with a compressed stream of data and an identification of the compression dictionary used to compress the compressed stream of data;
   compressing, by the network device, the stream of data using the compression dictionary to form the compressed stream of data; and
   transmitting, by the network device, the compressed stream of data to the receiving device.

2. The method of claim 1, where the stream of data comprises a transmission control protocol (TCP) stream.

3. The method of claim 1, where the selecting the compression dictionary from among the number of compression dictionaries based on the stream of data, further comprises:
   determining characteristics associated with the stream of data;
   comparing the determined characteristics with one or more compression rules, where each of the one or more compression rules corresponds to at least one data characteristic associated with a corresponding one of the number of compression dictionaries; and
   selecting the compression dictionary based on the comparing.

4. The method of claim 3, where the characteristics comprise network-related characteristics.

5. The method of claim 3, where the characteristics comprise at least one of: source internet protocol (IP) address, destination IP address, source port, destination port, or protocol.

6. The method of claim 3, further comprising:
   determining whether the compression dictionary is an existing dictionary;
   creating the compression dictionary when the compression dictionary is not an existing dictionary; and
   populating the compression dictionary during compression of the stream of data.

7. The method of claim 3, where the one or more compression rules include user-defined compression rules.

8. The method of claim 3, where the one or more compression rules include automatically-generated compression rules.

9. The method of claim 1, where transmitting the compression dictionary notification message, further comprises:
   receiving an acknowledgement message from the receiving device in response to the compression dictionary notification message.

10. The method of claim 9, where transmitting the compressed stream of data to the receiving device is performed following receipt of the acknowledgement message.

11. The method of claim 1, where transmitting the compressed stream of data to the receiving device further comprises transmitting the compressed stream of data over a wide area network (WAN).

12. A device for compressing data over a network, the device comprising:

a processor to:
   identify a compression dictionary associated with a received data stream, where the identified compression dictionary is one of a number of available compression dictionaries,
   transmit, to a receiving device, a compression dictionary notification message, where the compression dictionary notification message comprises at least an initial sequence number associated with a compressed data stream and an identification of the compression dictionary used to compress the compressed data stream,
   compress the received data stream using the identified compression dictionary to generate the compressed data stream, and
   transmit the compressed data stream to the receiving device over the network.

13. The device of claim 12, where the network is a wide area network (WAN).

14. The device of claim 12, where, when identifying the compression dictionary associated with the received data stream, the processor is further to:
   compare network characteristics of the received data stream to a number of compression rules, where each of the number of compression rules correlates the received data stream to individual ones of the number of available compression dictionaries based on the network characteristics.

15. The device of claim 14, where the number of available compression dictionaries includes a default compression dictionary, and
   where, when identifying the compression dictionary associated with the received data stream, the processor is further to:
      identify the default compression dictionary when the network characteristics of the received data stream do not match one of the number of compression rules.

16. A system comprising:
   a transmitting network device to:
      receive a data stream from a first local network, and
      transmit a compressed data stream via a wide area network; and
   a receiving network device to:
      receive the compressed data stream from the wide area network,
   the transmitting network device comprising logic to:
      select a compression dictionary from a number of compression dictionaries based on the received data stream,
      output a notification message to the receiving network device, where the notification message includes at least an identification of the compression dictionary and an initial sequence number associated with the compressed data stream and the identification of the compression dictionary,
      receive an acknowledgement message from the receiving network device indicating receipt of the notification message,
      compress the received data stream using the compression dictionary to form the compressed data stream, and
      transmit the compressed data stream to the receiving network device via the wide area network;
   the receiving network device comprising logic to:
      receive the notification message from the transmitting network device,
      identify the compression dictionary from the notification message,
      transmit the acknowledgement message to the transmitting network device,
      receive the compressed data stream, and
      decompress the compressed data stream using the compression dictionary.

17. The system of claim 16, where, when selecting the compression dictionary, the logic of the transmitting network device is further to:
   compare network characteristics of the received data stream to a number of compression rules, where each of the number of compression rules associates the received data stream to individual ones of the number of available compression dictionaries based on the network characteristics.

* * * * *